July 26, 1960   E. L. PITYO   2,946,453
SUPPORTING RACK FOR AUTOMOBILE WINDSHIELDS
Filed Feb. 13, 1959   2 Sheets-Sheet 1
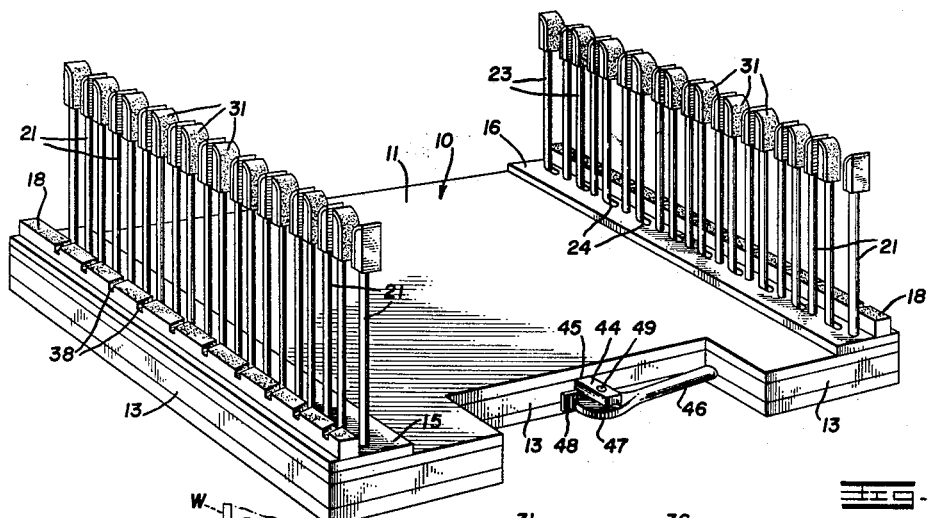
INVENTOR.
EDWARD L. PITYO July 26, 1960  E. L. PITYO  2,946,453
SUPPORTING RACK FOR AUTOMOBILE WINDSHIELDS
Filed Feb. 13, 1959  2 Sheets-Sheet 2
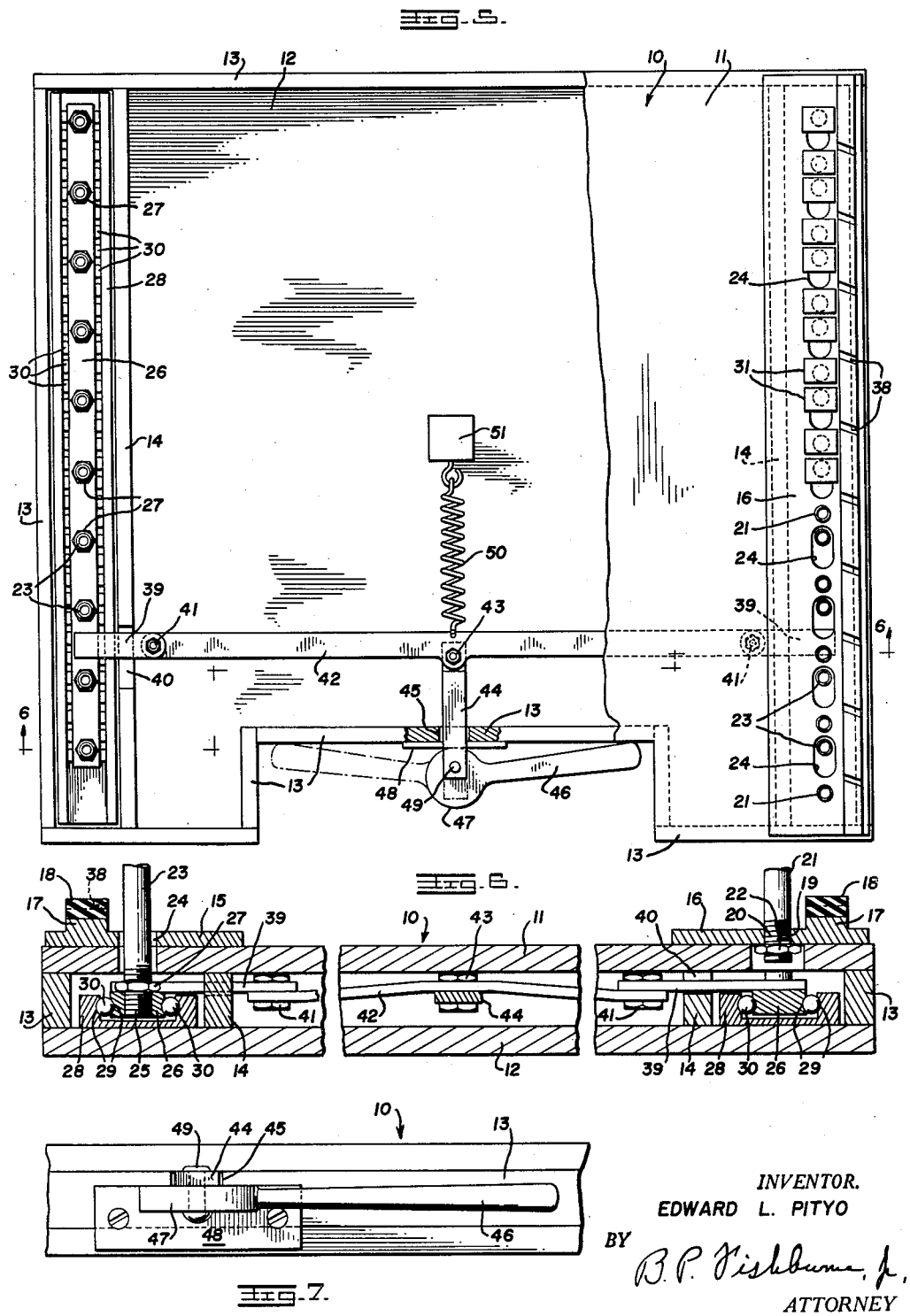
INVENTOR.
EDWARD L. PITYO United States Patent Office 2,946,453
Patented July 26, 1960

2,946,453

SUPPORTING RACK FOR AUTOMOBILE WINDSHIELDS

Edward L. Pityo, 1384 Pompton Ave., Cedar Grove, N.J.

Filed Feb. 13, 1959, Ser. No. 793,104

2 Claims. (Cl. 211—41)

This invention relates to a supporting rack for automobile windshields or the like.

A primary object of the invention is to provide a rack for supporting a plurality of automobile windshields of the compound curved type while the same are being transported from the distributor or wholesaler to individual retail shops.

A further important object of the invention is to provide a windshield supporting rack of the mentioned character having means to releasably clamp the individual windshields and hold them against movement and to also cushion the windshields so as to prevent damage thereto caused by vibration, sudden jarring and the like.

Another object is to provide clamping means for a plurality of supported windshields, which clamping means are operable in unison by manipulation of a single operating element.

A further object is to provide a windshield supporting rack including a multiplicity of clamping heads which are individually self-adjusting to conform to the curvature of the windshields which they engage.

Further and more general objects of the invention are to provide a rack of the above-mentioned character which is simplified in construction, sturdy and durable, reliable in operation, and relatively cheap to manufacture.

Other objects and advantages of the invention will be apparent during the course of the following description.

In the accompanying drawings, forming a part of this application, and in which like numerals are employed to designate like parts throughout the same, Figure 1 is a perspective view of a windshield supporting rack according to the invention.

Figure 2 is a fragmentary side elevation of the rack partly in section and partly broken away.

Figure 3 is a fragmentary plan view of the rack.

Figure 4 is an enlarged fragmentary exploded perspective view of one self-adjusting windshield clamping head and associated elements.

Figure 5 is a plan view of the rack with parts in section and parts broken away for the purpose of illustration.

Figure 6 is an enlarged fragmentary transverse vertical section taken on line 6—6 of Figure 5.

Figure 7 is an enlarged fragmentary end elevation of the rack showing the operating means for the several windshield clamping elements.

In the drawings, wherein for the purpose of illustration is shown a preferred embodiment of the invention, the numeral 10 designates generally a low supporting base which is horizontal in use, and comprising upper and lower spaced panels 11 and 12 of plywood or the like. The panels 11 and 12 of the base 10 are maintained spaced apart and rigidly interconnected by marginal frame sides 13, which enclose the entire margin of the base 10 and impart thereto a hollow box-like construction. Inwardly of and parallel to the sides of the base 10 are a pair of longitudinal spacer members 14 which extend from the front to the rear of the base as best shown in Figure 6. The base 10 is rigid and unitary in construction.

Rigidly secured to the top of the base 10 adjacent to its opposite sides are a pair of parallel longitudinal metal plates 15 and 16, which extend from the front to the rear of the base, as shown. Near and inwardly of the outer longitudinal edges of the plates 15 and 16, the same are provided with raised longitudinal ribs 17, having rubber cushioning strips 18 fixedly secured thereto.

Near and laterally inwardly of the ribs 17, the plates 15 and 16 are provided with groups of longitudinally equidistantly spaced screw-threaded openings 19, within which the lower screw-threaded ends 20 of a corresponding number of upstanding vertical stationary posts 21 are fixedly mounted and secured in place by lock nuts 22 beneath the plates 15 and 16, as shown.

Groups of movable upstanding vertical posts 23 are disposed in alignment with the stationary posts 21, in alternate relation thereto, and the movable posts 23 have their lower portions extending through spaced longitudinal slots 24 formed through the plates 15 and 16 and the upper panel 11 of the base 10. The lower screw-threaded ends 25 of the movable posts 23 engage within screw-threaded openings formed through longitudinal shifter bars 26, disposed below the upper panel 11 and between the frame or spacer members 13 and 14 of the base. Lock nuts 27 serve to rigidly secure the posts 23 to the shifter bars 26. Beneath the shifter bars 26, longitudinal channel members 28 are fixedly secured to the lower panel 12 between the members 13 and 14. The shifter bars 26 are received within the channel members 28 as best shown in Figure 6, and the channel members and shifter bars are longitudinally grooved as at 29 to receive ball bearings 30, which support the shifter bars 26 for lengthwise substantially frictionless movement through the channel members 28.

The tops of all of the posts 21 and 23 are provided with clamping heads 31 which have openings 32 in their lower ends, receiving the tops of the posts. The heads 31 are freely swiveled upon the posts so as to be self-adjusting around the longitudinal axes of the posts to enable the heads to position themselves automatically to conform to the longitudinal curvature of the windshields W, as indicated in Figure 3. The heads 31 receive set screws 33, having reduced extensions 34 which engage slidably within circumferential slots 35 of the posts near their upper ends. By this means, the heads 31 may turn freely upon the posts the desired amount, but will not become separated therefrom as when the windshields are lifted from the rack.

The heads 31 are rounded at their tops and upon one side as indicated at 36, and the corresponding sides, tops and rounded portions of the heads are covered by cushioning pads 37 of rubber or the like, fixedly secured thereto. As shown in Figures 1 and 2, the padded sides of the heads 31 on each adjacent pair of stationary and movable posts 21 and 23 are arranged back-to-back or in opposed relation to receive a windshield therebetween.

The rubber cushioning strips 18 are provided at spaced intervals with slightly diagonal grooves 38 to receive and position the lower edges of the windshields mounted upon the rack and disposed between the companion pairs of posts 21 and 23 and between the cushioning pads 37 of the heads 31. As shown in Figure 3, the grooves 38 of the cushioning strips 18 are arranged midway between each companion pair of posts 21 and 23, when the movable posts 23 are shifted to the windshield clamping position.

Means are provided to shift all of the movable posts 23 in unison toward and from the stationary posts 21. Such means comprises a pair of short links 39 rigidly secured by welding or the like to the tops of the shifter bars 26, near and rearwardly of the forward ends of such bars as shown in Figure 5. The short links 39 project inwardly of the shifter bars 26 at right angles thereto, and pass through horizontal slots 40 formed through the spacer members 14. Inwardly of the spacer members 14, the links 39 are pivotally secured at 41 to an elongated horizontal transverse bar or link 42 which spans a major portion of the base 10 as shown in Figure 5. At its longitudinal center, the link 42 is pivotally connected at 43 to a horizontal longitudinal pull link 44, arranged at the transverse center of the base 10 and extending through an opening 45 formed through the forward frame member 13.

Forwardly of the front frame member 13 of the base 10, an operating handle or lever 46 is disposed within a recessed area of the base, as shown. The lever 46 has a circular cam head 47 which bears against a reaction plate 48, rigidly secured to the front frame member 13, just below opening 45 and pull link 44. An eccentric crank pin 49 on the cam head 47 has pivotal connection with the forward end of the pull link 44, as shown. The arrangement is such that the turning of the lever 46 horizontally from its full line position in Figure 5 to its dotted line position therein will shift the pull link 44 forwardly a desired amount, such as three-quarters of an inch. When this occurs, the links 42 and 39 will simultaneously effect the forward shifting of all of the movable posts 23 on both sides of the rack a corresponding distance in unison, and the posts 23 and heads 31 carried thereby will be moved toward the stationary posts and heads 21 and 31 so that the windshields W may be clamped. The slots 24 previously described are of sufficient length to permit the necessary movement of the several posts 23 in unison.

A retractile coil spring 50 is preferably secured to the cross link 42 at its longitudinal center to aid in returning the movable posts 23 to their inactive positions for releasing the windshields, when the lever 46 is returned to the position shown in full lines in Figure 5. The rear end of the spring 50 is anchored to a fixed block 51, which also serves as an additional spacer between the upper and lower panels 11 and 12, centrally of the base 10.

In use, the rack is employed for transporting automobile windshields from the wholesaler or distributor to retail dealers. The rack may be placed within a truck for transportation, and windshields such as the well-known compound curved windshields in present day use are arranged edgewise upon the rack between the several companion pairs of stationary and movable heads 31 carried by the stationary and movable posts 21 and 23.

The lever 46 is initially positioned in the full line position shown in Figure 5, wherein the several movable posts 23 and their heads 31 are separated from the stationary posts 21 and are in open or non-clamping positions relative thereto. The windshields which may be of uniform design or differing designs are now placed edgewise across the base 10, Figure 3, and the lower edges of the windshields will engage within the grooves 38 of rubber cushioning strips 18, Figure 3. Each windshield W will be arranged between a pair of posts 21 and 23 and a pair of the heads 31 at opposite sides of the rack, and the windshield is disposed between the cushioning pads 37 of the heads as shown in Figures 2 and 3. The extreme ends of the windshield may now project somewhat outwardly of the opposite sides of the rack as shown in Figure 2, and the top of each windshield will extend somewhat above the heads 31 as indicated in Figure 2.

When all of the windshields are thus mounted between the pairs of heads 31 as indicated, the operating lever 46 is swung to the dotted line position of Figure 5, and this will cause the forward shifting in unison of all of the moving posts 23 toward the stationary posts 21 and effect the gripping or clamping of the windshields between the pairs of opposed heads 31. The lever 46 will remain in the broken line position of Figure 5 when released due to the fact that the crank pin 49 is on dead center with respect to the circular cam head 47, and the windshields will remain clamped by the heads 31 until the lever 46 is returned to the full line position shown in Figure 5.

When the windshields W are thus clamped by the heads 31, they will be firmly secured to the rack so that they will not move in any direction during transportation in a truck or the like. The lower longitudinally curved edges of the windshields will rest within the grooves of the cushioning strips 18 and the grooves will prevent lateral movement of the lower edges of the windshields. The padded heads 31 will also prevent lateral or vertical movement of the windshields clamped therebetween.

When a point of destination is reached where one or more windshields are to be delivered to a retail dealer, the lever 46 is merely swung to the full line position of Figure 5, and the spring 50 will cause the several movable posts 23 to shift in unison with the shifter bars 26 to the open or inactive position, where the windshields are no longer clamped by the heads 31 and may be readily lifted upwardly from between the heads and posts to clear the rack.

When the movable posts 23 and their heads 31 are in the inactive non-clamping position, the windshields which may not be removed from the rack at a particular dealer's location will not tilt or swing vertically, but will remain in contact with the heads 31 of the stationary posts 21 adjacent thereto. This is true, because as indicated in Figure 2, the center of gravity of each compound curved wrap-around windshield is to the right of the pad 37 on the head 31 of the stationary post 21. Consequently, during the time that the windshields are not clamped between the heads 31, they will tend to lean by gravity against the padded heads 31 of the stationary posts 21.

When the desired number of windshields are removed from the rack at a particular destination, the lever 46 is merely swung again to the clamping position shown in broken lines in Figure 5, and the truck may proceed to the next delivery point without danger of the windshields moving and becoming damaged, because they are again securely clamped between the opposed pairs of heads 31.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A rack for holding automobile windshields of the longitudinally curved type so that they may be transported without liability of breakage comprising, a lower base to be mounted upon a truck or the like for transportation, a first pair of rows of substantially vertical rigid spaced stationary posts rigidly mounted upon the base and the rows being arranged a sufficient distance apart to be positioned near the ends of the windshield, clamping heads having substantially flat clamping faces, means to pivotally mount the clamping heads upon the upper ends of the rigid stationary posts so that the clamping heads may turn upon the longitudinal axes of said posts, resilient pads mounted upon the clamping heads and covering the substantially flat faces, a second pair of rows of substantially vertical rigid spaced clamping posts, the rigid clamping posts in the second pair being arranged between the clamping posts of the first pair and spaced therefrom, the clamping posts of the second rows being arranged in alignment with the clamping posts of the first rows in a direction extending longitudinally of the first rows, second clamping heads having substantially flat faces, means to pivotally mount the second heads upon the upper ends of the posts of said second rows so that the second heads can turn upon the longitudinal axes of such posts, resilient pads mounted upon the second heads and extendings over the substantially flat faces of the second heads, holding means for the vertical posts in the second rows and having the vertical posts rigidly mounted thereon, said holding means being mounted upon the lower base, means to shift the holding means in one direction to draw the posts in the second rows toward the posts in the first rows and to positively hold the posts in the second rows in the shifted position, and resilient pads mounted upon the lower base and arranged adjacent to the first and second rows of posts and having grooves formed therein, said grooves being arranged opposite the spaces between the posts of the first and second rows.

2. A rack for holding automobile windshields of the longitudinally curved type so that they may be transported without liability of breakage comprising, a hollow lower base to be mounted upon a truck or the like for transportation, said lower base including a top and bottom, said top having opening means formed therein, a first pair of rows of substantially vertical rigid spaced stationary posts rigidly mounted upon the hollow lower base and the rows being arranged a sufficient distance apart to be positioned near the ends of the windshield, clamping heads having clamping faces, means to pivotally mount the clamping heads upon the upper ends of the rigid stationary posts so that the clamping heads may turn upon the longitudinal axes of said posts, resilient pads mounted upon the clamping heads, shifter bars mounted within the hollow lower base, a second pair of rows of substantially vertical rigid spaced clamping posts, the rigid clamping posts in the second pair being arranged between the clamping posts of the first pair and spaced therefrom, the clamping posts of the second rows being arranged in alignment with the clamping posts of the first rows in a direction extending longitudinally of the first rows, the clamping posts of the second rows extending through the opening means in said top and rigidly mounted upon the shifter bars, second clamping heads, means to pivotally mount the second clamping heads upon the upper ends of the posts of said second rows so that the second heads can turn upon the longitudinal axes of such posts, resilient pads mounted upon the second heads, cam operated means connected with the shifter bars to move them in one direction, and resilient pads mounted upon the top of the lower base and arranged adjacent to the first and second rows of posts and having grooves formed therein, said grooves being arranged opposite the spaces between the posts of the first and second rows.

References Cited in the file of this patent

UNITED STATES PATENTS

| | | |
|---|---|---|
| 1,028,978 | Tobbenboske | June 11, 1912 |
| 1,188,904 | Cosgriff | June 27, 1916 |
| 2,281,236 | Eckman | Apr. 28, 1942 |
| 2,572,355 | Kintz | Oct. 23, 1951 |

FOREIGN PATENTS

| | | |
|---|---|---|
| 330,426 | Great Britain | June 12, 1930 |